Patented Nov. 6, 1945

2,388,632

UNITED STATES PATENT OFFICE 2,388,632

GRANULAR SOAP PRODUCT

David R. Byerly, Wyoming, Ohio, assignor to The Procter & Gamble Company, Cincinnati, Ohio, a corporation of Ohio No Drawing. Application July 29, 1943,
Serial No. 496,583

15 Claims. (Cl. 252—368)

The present invention relates to an improved soap product and especially to granular soap products of improved characteristics.

When soap products in granular form such as spray dried soap, ground soap flakes, powdered soap, etc., prepared from fat formulas having little or no coconut oil are added to warm water for the purpose of preparing a cleansing solution, there is exhibited a tendency to form difficultly soluble masses or aggregates of the individual particles before solution of the soap product can be effected. This tendency, sometimes termed "balling" in the industry and herein so termed, is characteristic of most present day granular soap products and varies in degree, depending in part on the fat formula used in making the soap product, the moisture of the product, bulk density, and the degree of fineness of the individual particles of soap. It is not always possible to control the various factors which must be strictly observed and held within fixed limits in order that granular products substantially free of the tendency to ball may be obtained, and in this respect present day conditions involving curtailment of coconut oil usage are particularly acute because of the various restrictions and limitations which must be observed.

Balling of granular soap products, I believe, is the result of the formation of a difficultly soluble viscous form of soap around the individual soap particles, this formation taking place when certain temperature and moisture conditions exist on addition of the product to warm water. Before the particles can be dispersed throughout the water and completely dissolved therein, they adhere to each other and form agglomerates which are of course difficultly soluble also. Unfortunately, it so happens that the conditions which are conducive to the formation of these agglomerates include the normal conditions employed in the preparation of cleaning solutions from soap and this is especially true in the household.

It is an object of the present invention to produce soap products having reduced tendency to ball.

A further object is to produce efficient granular soap products which are substantially free of the tendency to ball.

Granular soap products produced from fat formulas containing a substantial amount, for example from about 40 per cent to 100 per cent, of an oil of the coconut oil group do not ball to an undesirable degree if at all under normal conditions of household use and I have discovered that if such a granular product is mechanically mixed with the granular soap product which is characterized by the tendency to ball, this tendency is materially reduced, and the degree to which the admixture will ball is markedly less than that of a soap product prepared directly from a mixture of fats containing the same proportion of oil of the coconut oil group.

The invention will be more clearly understood from the following examples and detailed description, but it is to be understood that such details are given merely by way of illustrating the manner in which the invention may be practiced and are not to be construed as limiting.

*Example 1.*—To 90 parts of a ground flake product prepared from a 39 titer tallow-grease mixture and having a bulk density of about 0.6 compared to water at 60° F. and a moisture content of about 8% are added 10 parts of a finely divided soap made from coconut oil. The two granular soap products are uniformly mixed mechanically and there results a product which is substantially free of the tendency to ball when added to water at 120° F. The ground flake product prepared from the tallow-grease mixture without the added coconut oil soap, on the other hand, had a pronounced tendency to ball when added to water under the same conditions and was an undesirable product for this reason. Furthermore, the surprising effect of the mechanically admixed granular coconut oil soap will be evident when it is pointed out that in order to obtain a similar product of comparable performance insofar as balling is concerned by the direct saponification of a fat mixture containing coconut oil, it was necessary to have in the neighborhood of at least 45% coconut oil present in the formula instead of only about 10% as in this example.

*Example 2.*—To 100 parts of a spray dried soap product prepared from a 39 titer tallow-grease mixture and having a bulk density of 0.42 as compared with water at 60° F. and a moisture content of about 12% are added 50 parts of a spray dried soap product comparable in physical characteristics except as to balling and prepared from a tallow-grease-coconut oil fat mixture containing 40% coconut oil. Whereas the product free of coconut oil was undesirable because of its pronounced balling characteristics, the mixture of same with the coconut oil-containing product had markedly reduced balling tendency and less than that which would be noted in a product prepared from a fat mixture containing an equivalent amount of coconut oil in its original fat formula.

Although I have illustrated my invention with the use of coconut oil soap as an agent for reducing the balling tendency, it should be understood that other oils of the coconut oil group, such as palm kernel oil for example, may be employed in place thereof without departing from the spirit of the invention.

I have observed that in the practice of the present invention, it is desirable to have the granular product, which is employed to reduce balling and which is prepared from the fat mixture containing a substantial amount of coconut oil or its equivalent, uniformly distributed throughout the product which possesses the balling tendency, and that for any given amount the effectiveness of the soap containing the coconut oil soap or equivalent in substantial proportion is dependent in part on its fineness and its uniformity of distribution throughout the mass. Thus effectiveness will be greatest when the soap derived from the fat containing the oil of the coconut oil group in substantial proportion is not only uniformly mechanically distributed throughout the product having balling tendencies, but also finely divided so as to contact each particle of the said product with which the mixture is made.

I am not limited in the individual particle size of my product but, of course, since the present application is directed to a granular product, I have in mind products not substantially larger than 20 mesh in size. The particle size of the granular soap containing a substantial amount of a soap of an oil of the coconut oil group may be equal or smaller than that of the product which is characterized by the tendency to ball but, as pointed out above, for any given amount its effectiveness will be greater with higher degrees of subdivision. Specifically, I prefer that the soap product added for the purpose of reducing the balling be in granular form from about 20 mesh to about 150 mesh in size.

It is also preferable that products used for reducing the balling tendency be derived from fat formulas containing at least about 40 per cent of an oil of the coconut oil group. A granular soap, for example, made of 100 per cent coconut oil is highly efficient and will convert granular soap products having very marked tendencies to ball into a substantially non-balling product by the addition of about 10 per cent to 20 per cent thereof.

It is to be noted also that all granular soap products do not ball at the same temperature. In some, balling will be more evident at lower temperatures than in the case of others, depending primarily on the kind of fats employed in the manufacture. However, my invention is suitable for use with all such products, irrespective of the temperature at which balling will be most pronounced and is not limited in this respect.

The two granular products which are admixed to produce the granular soaps of the present invention may be mixed in a suitable mixer or other suitable blender, or the one may be continuously proportioned into a stream of the other being carried on a belt in a screw conveyor or in an air lift. The manner of mixing is not a feature of my invention, but, as pointed out above, it is important to obtain uniform distribution of the one product throughout the other in order that maximum effectiveness may be realized.

Having thus described my invention, what I claim and desire to secure by Letters Patent is:

1. A granular soap product comprising a uniform mechanical mixture of a granular soap which balls when added to warm water and a granular, substantially non-balling soap product whose fat formula contains coconut oil in substantial proportion, the balling tendency of the mechanical mixture under comparable conditions being less than that of a granular soap product containing the same proportion of coconut oil soap and otherwise comparable, but prepared from a mixture of fats containing the coconut oil.

2. A granular soap product having reduced tendency to ball when added to warm water, comprising a uniform mechanical mixture of a granular soap which balls when added to warm water and a granular, substantially non-balling soap product whose fat formula contains an oil of the coconut oil group in amount in excess of forty per cent, the balling tendency of the mechanical mixture under comparable conditions being less than that of a granular soap product containing the same proportion of coconut oil soap and otherwise comparable, but prepared from a mixture of fats containing the coconut oil.

3. A granular soap product having reduced tendency to ball when added to warm water, comprising a uniform mechanical mixture of a granular soap which balls when added to warm water and a granular, substantially non-balling soap product whose fat formula contains coconut oil in amount in excess of forty per cent, the balling tendency of the mechanical mixture under comparable conditions being less than that of a granular soap product containing the same proportion of coconut oil soap and otherwise comparable, but prepared from a mixture of fats containing the coconut oil.

4. A granular soap product having reduced tendency to ball when added to warm water, comprising a uniform mechanical mixture of a granular soap which balls when added to warm water and a granular, substantially non-balling soap product whose fat formula contains palm kernel oil in amount in excess of 40 per cent, the balling tendency of the mechanical mixture under comparable conditions being less than that of a granular soap product containing the same proportion of palm kernel oil soap and otherwise comparable but prepared from a mixture of fats containing the palm kernel oil.

5. A granular soap product having reduced tendency to ball when added to warm water, comprising a uniform mechanical mixture of a granular soap which balls when added to warm water, and at least about ten per cent of coconut oil soap in granular form, the performance of the product with regard to tendency to ball when added to warm water being at least as good as an otherwise comparable granular soap product prepared from a fat formula containing 45 per cent coconut oil.

6. A granular soap product having reduced tendency to ball when added to warm water, comprising a uniform mechanical mixture of a granular soap which balls when added to warm water, and about ten per cent to about 20 per cent of ground coconut oil soap flakes from about 20 mesh to about 150 mesh, the performance of the product with regard to tendency to ball when added to warm water being at least as good as an otherwise comparable granular soap product prepared from a fat formula containing 45 per cent coconut oil.

7. A granular soap product having reduced tendency to ball when added to warm water, comprising a uniform mechanical mixture of a spray dried soap product derived from a tallow-grease mixture and which balls when added to water at about 120° F., and coconut oil soap in substantially non-balling granular form, the balling tendency of the mechanical mixture under comparable conditions being less than that of a granular soap product containing the same proportion of coconut oil soap and otherwise comparable, but prepared from a mixture of fats containing the coconut oil.

8. A granular soap product which is substantially free of tendency to ball when added to water at 120° F., comprising a uniform mechanical mixture of a granular soap product derived from a tallow-grease mixture, and at least about 10 per cent of substantially non-balling coconut oil soap in granular form, the performance of the product with regard to tendency to ball when added to warm water being at least as good as an otherwise comparable granular soap product prepared from a fat formula containing 45 per cent coconut oil.

9. A granular soap product comprising a uniform mechanical mixture of a granular soap which balls when added to warm water and a granular, substantially non-balling soap product whose fat formula contains an oil of the coconut oil group in substantial proportion, the balling tendency of the mechanical mixture being less than that of a granular soap product containing the same proportion of soap of the oil of the coconut oil group but prepared from a mixture of fats containing the oil of the coconut oil group.

10. A granular soap product comprising a uniform mechanical mixture of a granular soap which balls when added to warm water and granular, substantially non-balling coconut oil soap, the balling tendency of the mechanical mixture being markedly less than that of a granular soap product containing the same proportion of coconut oil soap but prepared from a mixture of fats containing the coconut oil.

11. The product of claim 9 in which the particle size of the granular soap prepared from a fat formula containing the oil of the coconut oil group in substantial proportion is not substantially larger than the particle size of the granular soap which balls.

12. The product of claim 1 in which the particle size of the granular soap prepared from a fat formula containing coconut oil in substantial proportion is not substantially larger than the particle size of the granular soap which balls.

13. The product of claim 1 in which the particle size of the granular soap prepared from a fat formula containing coconut oil in substantial proportion is substantially smaller than the particle size of the granular soap which balls.

14. The product of claim 1 in which the particle size of the granular soap prepared from a fat formula containing coconut oil in substantial proportion is substantially smaller than the particle size of the granular soap which balls but not smaller than about 150 mesh.

15. The product of claim 1 in which the particle size of the granular soap prepared from a fat formula containing coconut oil in substantial proportion is from about 20 mesh to about 150 mesh.

DAVID R. BYERLY.